United States Patent [19]

Immendorfer et al.

[11] Patent Number: 4,837,808

[45] Date of Patent: Jun. 6, 1989

[54] CIRCUIT CONNECTING A VOICE-CONTROLLED DEVICE TO A TELEPHONE STATION AND LINE

[75] Inventors: Manfred Immendorfer, Ditzingen; Dieter Kopp, Hemmingen; Thomas Hormann, Grossbottwar, all of Fed. Rep. of Germany

[73] Assignee: Alcatel N.V., Amsterdam, Netherlands

[21] Appl. No.: 106,951

[22] Filed: Oct. 13, 1987

Related U.S. Application Data

[63] Continuation of Ser. No. 753,841, Jul. 11, 1985, abandoned.

[30] Foreign Application Priority Data

Jul. 13, 1984 [DE] Fed. Rep. of Germany ....... 3425789

[51] Int. Cl.$^4$ ...................... H04M 11/00; H04M 1/26
[52] U.S. Cl. ........................................ 379/96; 379/355
[58] Field of Search ...................... 379/52, 93, 96, 97, 379/98, 354, 355; 381/43; 358/85

[56] References Cited

U.S. PATENT DOCUMENTS

| | | |
|---|---|---|
| Re. 32,012 | 10/1985 | Pirz et al. ............... 379/355 X |
| 3,944,736 | 3/1976 | Shepard . |
| 3,984,638 | 10/1976 | Carrouge ................... 379/96 |
| 4,071,697 | 1/1978 | Bushnell et al. ............ 358/85 X |
| 4,150,254 | 4/1979 | Schussler et al. ............ 379/96 |
| 4,289,930 | 9/1981 | Connolly et al. ............ 379/96 X |
| 4,393,271 | 7/1983 | Fujinami et al. ............ 381/43 |
| 4,453,043 | 6/1984 | Zielinski et al. ............ 379/52 |
| 4,554,418 | 11/1985 | Toy ........................ 379/97 X |
| 4,571,463 | 2/1986 | Shefler ..................... 379/355 |
| 4,581,484 | 4/1986 | Bendig ..................... 379/96 X |
| 4,593,157 | 6/1986 | Usdan ...................... 379/355 X |
| 4,644,107 | 2/1987 | Clowes et al. ............... 379/354 |

FOREIGN PATENT DOCUMENTS

| | | |
|---|---|---|
| 027596 | 4/1981 | European Pat. Off. . |
| 045941 | 2/1982 | European Pat. Off. . |
| 105441 | 4/1984 | European Pat. Off. . |

OTHER PUBLICATIONS

M. Immendorfer, "Voice Dialer", *Electrical Communication*, (ITT), vol. 59, No. 3, May 6, 1985, pp. 281-285.
James L. Flanagan, "Computers that Talk and Listen: Man-Machine Communication by Voice", *Proceedings of the IEEE*, vol. 64, No. 4, Apr. 1976, pp. 405-415.

*Primary Examiner*—Keith E. George
*Attorney, Agent, or Firm*—Spencer & Frank

[57] ABSTRACT

The present invention is directed to a circuit arrangement for connecting a voice-controlled additional facility associated with a telephone station to a telephone line. According to the invention a telephone station (32) is connected with a voice-controlled additional facility (2). The additional facility (2) performs voice-controlled telephone dialing and/or voice-controlled operation of a videotex terminal. This is implemented by a connection unit (14) inserted in the telephone line (16). The connection unit (14) cooperates with the exchange to permit calls to be initiated, in the known manner, by means of a keypad at the telephone station (32). Any type of telephone station (32) can be connected to the voice-controlled additional facility (2) without any engineering modifications.

7 Claims, 1 Drawing Sheet

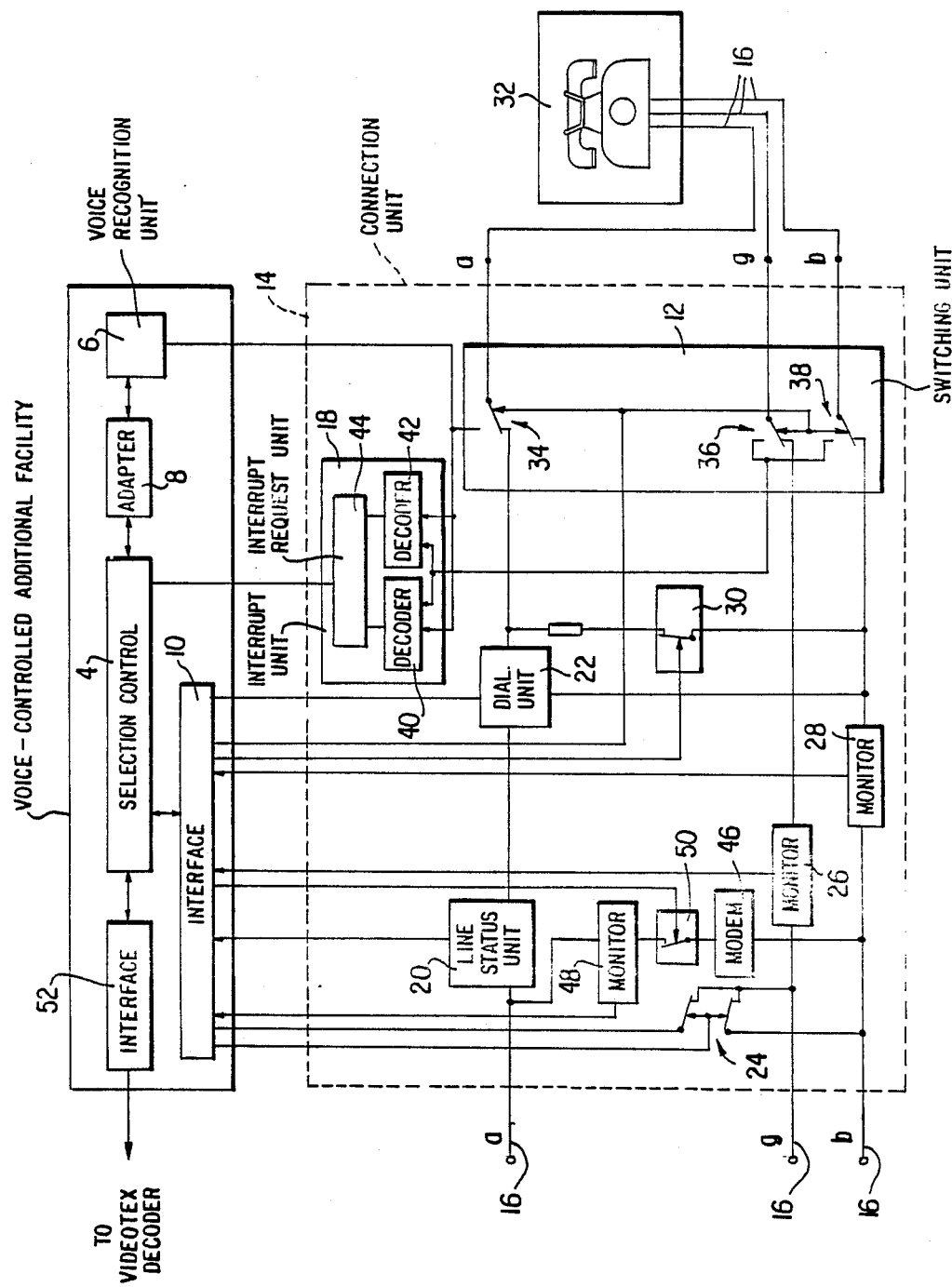

CIRCUIT CONNECTING A VOICE-CONTROLLED DEVICE TO A TELEPHONE STATION AND LINE

This application is a continuation of application Ser. No. 06/753,841, filed July 11, 1985, now abandoned.

BACKGROUND OF THE INVENTION

The present invention relates to a circuit arrangement for connecting a voice-controlled additional facility associated with a telephone station to a telephone line, the voice-controlled additional facility containing a voice recognition unit and a selection control means.

A telephone subscriber station enabling voice-controlled dialling of the subscriber to be called through direct acoustical entry of words and/or numbers via the receiver microphone has already been described in Federal Republic of Germany patent application No. P 33 38 484 3.

However a disadvantage of the described arrangement is that engineering modifications must be performed in the telephone station in order to attach the voice-controlled additional facility.

SUMMARY OF THE INVENTION

It is the technical object of the present invention to create a circuit arrangement for connecting a voice-controlled additional facility associated with a telephone station to a telephone station.

A circuit arrangement according to the present invention of the type cited at the outset is characterized in that a switching unit of a connection means is looped into an a-conductor, a b-conductor and a ground wire of the telephone line, and is also connected with the voice recognition unit and, via an interrupt unit of the connection means, with the selection control means, thereby connecting the telephone station via the telephone line either to an exchange or to the voice-controlled additional facility, in that the connection means has a line status identification logic means, a dialling unit, a loop monitoring means and a grounding key monitoring means, which are looped into the telephone line and are also attached to the selection control means via a first interface of the voice-controlled additional facility, and in that a first switch, which connects the a-conductor and the b-conductor in the connection means, is connected with the selection control means via the first interface.

A particular advantage of the present invention is that any desired telephone station can be connected with the voice-controlled additional facility without engineering modification.

BRIEF DESCRIPTION OF THE DRAWING

The sole FIGURE is a block diagram illustrating a voice-controlled additional facility which can be connected to a telephone station via a connection unit.

DESCRIPTION OF THE PREFERRED EMBODIMENT

As can be seen from the only FIGURE, a voice-controlled additional facility 2 has a selection control unit 4, which is attached to a voice recognition unit 6 via an adapter unit 8 and is also attached to a first interface 10.

A switching unit 12 of a connection unit 14 is looped into an a-conductor a, a b-conductor b and a ground wire G of a telephone line 16, and is also connected with voice recognition unit 6, as well as with selection control unit 4, via an interrupt unit 18 of connection unit 14.

Connection unit 14 contains a line status identification logic unit 20, looped into a-conductor a and b-conductor b, a dialling unit 22, connected with a-conductor a and b-conductor b, a ground key 24, a grounding key monitoring unit 26, connected with ground wire G, and a loop monitoring unit 28, cooperating with a-conductor a and b-conductor b. Each of these four units is connected with selection control unit 4 of voice-controlled additional facility 2 via first interface 10. Moreover, a first switch 30 in connection unit 14, which connects a-conductor a and b-conductor b, is attached to selection control unit 4 via first interface 10.

If a receiver of an associated telephone station 32 is now taken off-hook, loop monitoring unit 28 signals the selection control unit 4, via first interface 10, that the loop of telephone line 16, which is connected with telephone station 32, has been closed. If, for example, line status identification logic unit 20 has identified an incoming call (no dial tone), selection control unit 4 is notified of this status via first interface 10. Connection unit 14 is then switched to the so-called "transparent mode" by selection control unit 4, i.e. it is not possible for connection unit 14 to influence the voice channel (a-conductor a, b-conductor b).

However, if an outgoing call is signaled to selection control unit 4 through detection of a dial tone by the line status identification logic unit 20, selection control unit 4 then initiates the following:

First of all, switch 30 is closed, thereby preventing the loop current from being interrupted. Telephone station 32 is then connected with the voice-controlled additional facility 2 by switching unit 12, via telephone line 16. To accomplish this, the voice channel (a-conductor a and b-conductor b) and ground wire G are first connected with voice recognition unit 6 via a first switching member 34, a second switching member 36 and a third switching member 38 of switching unit 12 and with selection control unit 4 via interrupt unit 18.

The user now acoustically enters the desired destination to be dialled in the form of words and/or numbers, by speaking into the receiver microphone of telephone station 32. The voice signal is processed in voice recognition unit 6 by comparing the similarity of a spoken word (number) with stored reference pattern data. The storage location number of the most similar pattern addresses the associated subscriber name (number) in a name directory, and the subscriber number to be dialled is read out of a directory store associated to this name directory. Selection control unit 4 advances the coded subscriber number signals to dialling unit 22 via first interface 10; dialling unit 22 then initiates conversion into dialling signals that can be processed by the exchange. Since dialling unit 22 contains a module for the dial-pulsing dialling method (DPM) as well as a module for the multi-frequency code dialling method (MFC), either dialling method can be employed, as desired.

As soon as the dialling process has been completed, selection control unit 4 again re-connects telephone station 32 back with the exchange, via first, second and third switching members 34, 36, and 38 of switching unit 12, and opens first switch 30, thereby permitting the user to conduct the desired call.

Selection control unit 4 is now in a wait status, with the hook status being sensed by the attached loop monitor-monitoring unit 28 ("off-hook", as opposed to "on-hook") and grounding key monitoring unit 26. Upon completion of the call (receiver on-hook), which is signaled by loop monitoring unit 28, selection control unit 4 returns to its initial status. If, however, the grounding or hold 24 is actuated in a P.A.B.X. system for the purpose of forwarding the call, for example, which is detected by grounding key monitoring unit 26 or loop monitoring unit 28 the same procedures described at the outset (beginning with line status identification logic unit 20) are again controlled by selection control unit 4.

In the facility according to the present invention, a connection can be established in a "conventional" manner at any time by manually entering the subscriber number by means or a dial or a keypad on telephone station 32, without the employment of voice-controlled additional facility 2.

Connection unit 14 has an interrupt unit 18 for this purpose. Interrupt unit 18 contains a dial pulse decoder 40 and a multi-frequency decoder 42, which are attached to selection control unit 4 via an interrupt request unit 44. After the receiver of telephone station 32 is taken off-hook, the previously described processes are first performed. Actuation of the dial or the keypad by the user is then identified by the above-mentioned decoders 40 or 42. Selection control unit 4 now receives an interrupt command from interrupt request unit 44, thereby initiating immediate switch-back of telephone station 32 to the exchange via telephone line 16 by means of switching unit 12, as well as causing first switch 30 to break. The dialling signals can then be transmitted directly to the exchange, without loss.

A further advantage of the circuit arrangement according to the present invention is that a series circuit comprising a videotex modem 46 and a videotex monitoring unit 48 can be connected with a-conductor a and b-conductor b via a second switch 50 in connection unit 14. In this case, selection control unit 4 is connected with second switch 50 via first interface 10 and with a videotex decoder of a television set via a second interface 52.

By acoustically entering words and/or numbers via the receiver microphone of telephone station 32, it is possible for the user to call up the videotex service feature by means of a voice command. By entering a command, such as "videotex," for example, which is processed by voice-controlled additional facility 2, selection control unit 4 then connects videotex modem 46 with telephone line 16 by means of second switch 50. Videotex modem 46 automatically dials the videotex exchange after the television set has been switched on. When videotex monitoring unit 48 determines that a connection has been established and signals this status to selection control unit 4, first switch 30 is broken again.

Voice recognition unit 6 now remains connected with telephone station 32 for "voice control." The user enters his videotex control commands acoustically, in the form of words and/or numbers. The voice signal is processed in voice recognition unit 6 and compared with the stored reference patterns. The storage location number of the most similar pattern addresses an associated videotex code directory, whose content is read out and advanced to the videotex decoder of a television set via second interface 52. This initiates a control process when the videotex service is called up. Upon completion of the videotex service, selection control unit 4, and thus connection unit 14, are returned to their initial status.

In the event of a voltage failure of voice-controlled additional facility 2 or connection unit 14, the remaining functions of telephone station 32 are not impaired.

We claim:

1. A circuit arrangement for connecting a voice controlled additional facility associated with a telephone station and said telephone station to a telephone line containing at least first and second conductors, said telephone station including a telephone set having a microphone for receiving voice messages and said voice controlled additional facility including a voice recognition circuit, selection control means for controlling the mode of operation of said voice controlled additional facility and interface means for connection of said voice controlled additional facility, said circuit arrangement comprising:

interrupt means connected to said selection control means of said voice controlled additional facility, said interrupt means acting to signal the presence of telephone set dialing information to said voice controlled additional facility to inhibit the operation thereof;

a switching unit connected into said first and second conductors of said telephone line and to said voice recognition circuit and, through said interrupt means, to said selection control means, thereby selectively connecting said telephone station via said telephone line either to an exchange or to said voice controlled additional facility;

loop monitoring means for determining the On-Hook and Off-Hook condition of said telephone set and signalling the condition determined to said selection control means through said interface means;

line status identification means for detecting the presence of an outgoing or incoming telephone call and signalling the presence detected to said selection control means through said interface means, said line status identification means being connected to said switching unit;

means for selectively connecting said first and second conductors of said telephone line, said means for connecting being coupled to said loop monitoring means and said line status identification means; and dialing means responsive to signals generated by said voice recognition circuit for applying dialing signals to said telephone line, said dialing means being connected to said switching unit and said means for connecting and acting when said telephone set is in an Off-Hook condition and the presence of an outgoing telephone call is ascertained to apply dialing signals to said telephone line when outgoing telephone call dialing statements are spoken into said microphone.

2. The circuit arrangement according to claim 1 additionally comprising means responsive to said selection control means for establishing a closed circuit condition across said means for connecting.

3. The circuit arrangement according to claim 1 additionally comprising a videotex modem, a videotex monitoring unit and a switch connected in series between said first and second conductors of said telephone line, said switch and said videotex monitoring unit receiving control signals from said selection control means.

4. The circuit arrangement according to claim 1 wherein said dialing means and said interrupt means each contain pulse dialing and multifrequency dialing modules.

5. A circuit arrangement for connecting a voice controlled additional facility associated with a telephone station and said telephone station to a telephone line containing at least first and second conductors, said telephone station including a telephone set having a microphone for receiving voice messages and said voice controlled additional facility including a voice recognition circuit for matching said voice messages with stored reference patterns and emitting predetermined signals corresponding to respective reference patterns, said predetermined signals including signals corresponding to telephone numbers, selection control means for controlling the mode of operation of said voice controlled additional facility, said selection control means receiving said predetermined signals, and interface means for connection of said voice controlled additional facility, said circuit arrangement comprising:

interrupt means, connected to said selection control means of said voice controlled additional facility, for signaling the presence of telephone set dialing information to said voice controlled additional facility to inhibit the operation thereof;

switch means for selectively connecting said telephone set to said first and second conductors of said telephone line and to said voice recognition circuit and said interrupt means whereby said telephone station may be selectively connected to said voice controlled additional facility and to a telephone exchange through said telephone line;

loop monitoring means for determining the On-Hook and Off-Hook condition of said telephone set and signalling the condition determined to said selection control means through said interface means;

line status identification means for detecting the presence of an outgoing or incoming telephone call and signalling the presence detected to said selection control means through said interface means, said line status identification means being connected to said switch means;

further switch means for selectively establishing a current path between said first and second conductors of said telephone line, said further switch means being connected to said interface; and dialing means responsive to said signals corresponding to telephone numbers for applying dialing signals to said telephone line, said dialing means being connected to said switch means and said further switch means and acting when said telephone set is in an Off-Hook condition and the presence of an outgoing telephone call is ascertained to apply dialing signals to said telephone line in response to said signals corresponding to telephone numbers resulting from outgoing telephone call dialing statements spoken into said microphone.

6. The circuit arrangement according to claim 5 additionally comprising a videotex modem, a videotex monitoring unit, and a switch, said videotex modem, switch, and videotex monitoring unit being connected in series between said first and second conductors of said telephone line, said switch and said videotex monitoring unit receiving control signals from said selection control means.

7. The circuit arrangement according to claim 5 wherein said dialing means and said interrupt means each contain pulse dialing and multifrequency dialing modules.

* * * * *